(12) United States Patent
Ångström

(10) Patent No.: US 6,314,936 B1
(45) Date of Patent: Nov. 13, 2001

(54) METHOD AND DEVICE FOR FUEL INJECTION IN A COMBUSTION ENGINE

(75) Inventor: Hans-Erik Ångström, Huddinge (SE)

(73) Assignee: Sigmec AB, Huddinge (SE)

( * ) Notice: Subject to any disclaimer, the term of this patent is extended or adjusted under 35 U.S.C. 154(b) by 0 days.

(21) Appl. No.: 09/367,634

(22) PCT Filed: Oct. 23, 1997

(86) PCT No.: PCT/SE97/01776

§ 371 Date: Aug. 18, 1999

§ 102(e) Date: Aug. 18, 1999

(87) PCT Pub. No.: WO98/36170

PCT Pub. Date: Aug. 20, 1998

(30) Foreign Application Priority Data

Feb. 18, 1997 (SE) .................................................. 9700561

(51) Int. Cl.⁷ .................................................. F02M 61/18
(52) U.S. Cl. ...................................... 123/305; 239/533.12
(58) Field of Search ..................................... 123/294, 305; 239/533.1, 533.12, 533.4, 533.3

(56) References Cited

U.S. PATENT DOCUMENTS

| | | | | |
|---|---|---|---|---|
| 1,592,260 | * | 7/1926 | Waern | 123/305 |
| 3,621,821 | * | 11/1971 | Jarnuskiewicz | 123/305 |
| 4,204,506 | * | 5/1980 | Bowling | 123/294 |
| 6,055,957 | * | 5/2000 | Hasegawa et al. | 123/305 |

FOREIGN PATENT DOCUMENTS

| | | |
|---|---|---|
| 4203343C1 | 5/1993 | (DE) . |
| 0713004A1 | 5/1996 | (EP) . |
| 2096702-A1 | * 10/1982 | (GB) . |
| WO94/10440 | 5/1994 | (WO) . |

OTHER PUBLICATIONS

"Variable Orifice Geometry Verified on the Two-Phase Nozzle (VRD)" Detlev Potz et al., SAE Technical Papers Series, No. 950081 (1995) pp. 53–62.

* cited by examiner

Primary Examiner—Willis R. Wolfe
(74) Attorney, Agent, or Firm—Burns, Doane, Swecker & Mathis, L.L.P.

(57) ABSTRACT

The invention concerns a method by combustion in an internal combustion engine, for example a direct injected diesel engine, in which the fuel injection is done with during the injection changing direction to avoid injection into an already fuel rich location and a device for fuel injection in an internal combustion engine in which the injector is provided with an injector nozzle (1), that is arranged to spray a fuel spray (23) through at least one hole (311) into the engine combustion chamber and the injection is arranged to be done with during the injection changing direction to avoid injection in an already fuel rich location.

48 Claims, 5 Drawing Sheets

METHOD AND DEVICE FOR FUEL INJECTION IN A COMBUSTION ENGINE

TECHNICAL FIELD

The invention is related to the field of internal combustion engine technics and especially to a new technics for injection of a fuel mixture in a combustion chamber.

BACKGROUND OF THE INVENTION

In a conventional combustion of a fuel air mixture in a flame in a combustion chamber it is common to spray fuel through a hole in a stationary nozzle. The combustion may then be a so called diffusion flame. The combustion of a diffusion flame is exemplified by the combustion in a diesel engine.

In a diffusion flame, the combustion is achieved by diffusion, that is molecular transportation mainly through turbulence, of fuel vapour from the interior of the flame and diffusion of oxygen from outside to the flame front. Because of the continues injection to the flame centre, a high concentration of fuel is maintained in the already oxygen lacking flame centre. In the flame centre with nearest surroundings soot formation is taking place as an intermediate step in the combustion because of high temperature and lack of oxygen.

In the outskirts of the flame where the oxygen is added, the highest temperatures is maintained where the mixture ratio is near to stoichiometric. In the locations with the highest temperatures, most of the NOx formation is taking place. A certain air entrainment occurs into the flame centre, but the amount is far to little for complete combustion.

The development of the combustion system is normally achieved by influencing the injection pressure, change of the number of holes, by influencing the air movement and combustion chamber geometry. All these earlier known systems are however based on injecting the fuel mixture in a combustion chamber in stationary directions, that is where it after an initial process, a lack of oxygen quickly develops in the direction of injections.

The technical report SAE950081 describes an injector with variable hole area. The holes is here doing an axial movement. The movement is only taking place during the opening phase and the movement does not give the wanted effect. This type of injector with the holes located in the injector needle should enable an in the injector built in turning and axial movement mechanism.

PURPOSE OF THE INVENTION

The purpose of the presented invention is to solve the problem of lack of oxygen, soot- and NOx-formation in conjunction with fuel injection with conventional practice and devices in conjunction with combustion in a combustion chamber.

SUMMARY OF THE INVENTION

This purpose is achieved by a method and device according to following patent claims, where the injection is taking place with varying direction during the injection event. Thus the purpose of the presented invention is to achieve a method and device witch enables a position changing injection of a fuel mixture into a combustion chamber with features which are described of the following patent claims.

SHORT DESCRIPTION OF THE DRAWINGS

The invention will now be described in more detail with notations according to attached drawing figures.

DESCRIPTION OF THE INVENTION

Figure 1:
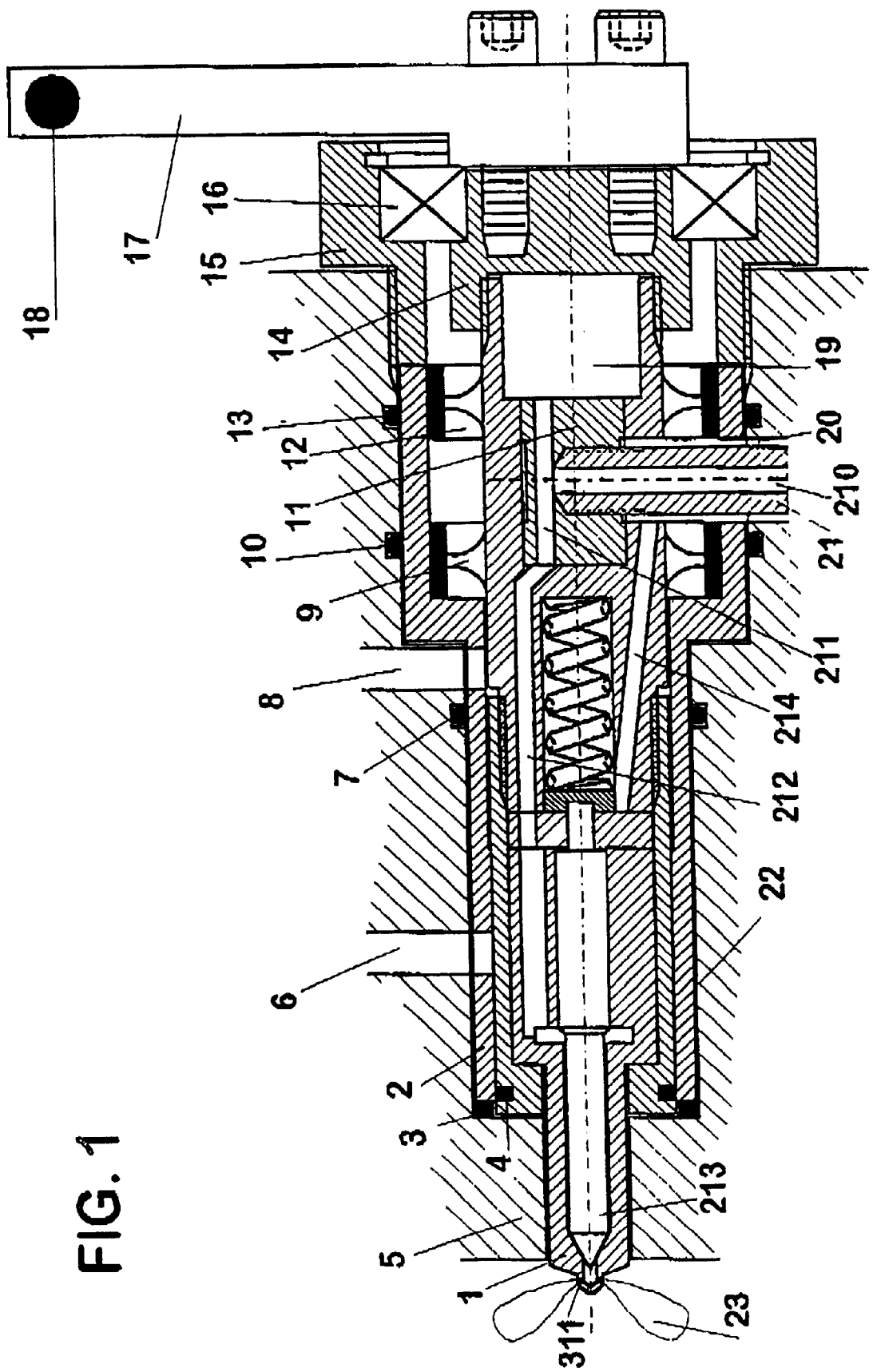
FIG. 1 shows an axial section through a first design of a device according to the invention.

The following description applies to a direct injected diesel engine, but the invention is applicable on all similar combustion systems.

The invention concerns a system for combustion where the injection continuously changes direction which avoids to spray into a already oxygen lacking flame centre.

One from NOx formation view desirable type of combustion is premixed lean combustion. The lean combustion is also beneficial from soot formation view. The diesel engine is always operating lean in average. Because the injection always takes place in a constant direction, inhomogenous conditions with fuel rich locations and intermediate zones without fuel and combustion.

The combustion in a diesel engine starts as premixed combustion with a unwanted fast pressure increase rate. During the ignition delay, fuel has accumulated in a limited volume with the result that a big volume has near stoichiometric mixture strength with following fast combustion. By during the ignition delay distributing fuel in a larger volume by injecting in different directions, an in average leaner mixture can be achieved. The system can be optimised for mixing conditions with a big portion of lean mixture with following smooth combustion speed, low NOx and soot formation.

After the ignition delay temperature and pressure increase occurs in the hole combustion chamber. The largest temperature increase occurs in zones where fuel has been combusted. The fuel has ignition delay also after that the combustion has started, but with the higher temperatures, the ignition delay is shorter. By increasing the mixing speed with the aid of increasing the injection pressure, it can be sought after conditions which also during the ignition delay after start of combustion can mix to lean before the combustion starts. Through the changing injection direction the injection will take place in colder zones (where no combustion has taken place), thus the time for mixing before start of combustion of the latest injected fuel increases. The system according to the invention has the potential to mix to lean before the combustion. Under all circumstances the new system gives completely new air movements induced by the injection in different directions, which enables optimising for a more environmental friendly combustion compared to what can be achieved with a stationary injector.

The diesel engine show gradual decreasing combustion rate after the end of injection. This slow termination of the combustion depends of that the remaining soot clouds from the centres of the fuel sprays have long diffusion distances and at the end of the process the total amount of oxygen is smaller. With the much more intense fuel air mixing with injection according to the invention, the total combustion time will be shorter with an increase in engine efficiency as result.

To achieve injection in different direction, the injector can be given an axial movement or a rotational movement or a combination of these. Here is a system with pure rotational movement described.

FIG. 1 shows a first design where the injector is provided with an injector nozzle 1 which is forward and backward turnable in relation to a cylinder head 5 by providing the injector nozzle 1 with a lower retaining nut 22 not turnable mounted through a thread in the injector and sealed against an injector sleeve 2 which is sealed against the cylinder head 5.

The injector sleeve 2 is sealed against the cylinder head through a lower seal 3 while the retaining nut 22 for the injector nozzle 1 is sealed against the injector sleeve 2 through a piston ring seal 4. The injector revolution is lubricated by oil from an oil inlet 6 in the cylinder head 5 and the oil is drained through an oil outlet 8 also situated in the cylinder head 5. The injector sleeve 2 is further sealed between the oil inlet and the oil outlet through a lubricant seal 7 and furthermore sealed against the cylinder head in the upper wider part through an intermediate seal 10 and a upper seal 13. The injector is supported by a journal bearing in the injector sleeve 2.

In the upper wider part of the injector sleeve 2, the injector nozzle 1 is sealed against a cylindrical shaped internal surface in the injector sleeve 2 through a lower return fuel seal 9 and an upper return fuel seal 12. Through the lower return fuel seal 9 the return fuel is prevented from leak into the lubricating oil which would reduce its performance. Through the upper return fuel seal 12 the return fuel is prevented from leaking out of the injector.

The supply of fuel mixture to the injector is achieved through a fuel line 21 inserted radial from the cylinder head 5 into the upper part of the injector nozzle 1 and screwed into an in the injector nozzle 1 centrally mounted cylindrical shaped swivel 11. The fuel line 21 is provided with a supply channel 210 which is connected with one in the swivel arranged supply channel 211 which in turn is connected to a supply channel 212 in the injector nozzle 1. The fuel mixture is flowing into the injector through the supply channel 210, fuel channel 211, the supply channel 212 and then flow into the combustion chamber when an injector needle 213 opens. The fuel is distributed into the combustion chamber through hole 311 in the injector nozzle 1 as a fuel spray 23. For leakage fuel a fuel return channel 214 is arranged to allow fuel to be returned to a around the fuel supply line concentric arranged leakage fuel outlet 20.

The swivel 11 is axially sealed upwards through a plug 19 which is kept in axial tension towards the injector nozzle 1 with the help of an upper retaining nut 14. The retaining nut 14 and thus the injector is concentric suspended in a tension sleeve 15 through a roller bearing 16. Furthermore a lever 17 is bolted in the retaining nut 14 with the result that the lever can revolve the injector nozzle 1 through a cam or equivalent which moves the lever at an alignment surface 18. When the injector nozzle 1 is turning, the pressure line 21 is retaining the swivel 11 and a relative movement is taking place between the swivel 11 and the injector nozzle 1. The fuel line 21 is then displaced in a slit in the injector nozzle 1. This first design of an injector for a direct injected diesel engine is thus designed for turning during the injection event.

For such an injector a row of functions must be achieved, like gas seal against the combustion chamber, journalling in bearings and cooling of the injector, fuel connection and an actuator system to achieve the rotating movement.

The gas seal in this first design according to FIG. 1 is achieved by the piston ring 4 which is located in a groove in the retainer nut 22. The retainer nut is further movable with a small clearance in the lower part (left in the figure) towards the injector sleeve 2. Into this small clearance, pressurised oil from the engine lubricating system is supplied through the oil supply channel 6 in the cylinder head 5 (groove should be provided to distribute the oil around the circumference). The oil together with blow by gases is then evacuated through the oil drain 8. The lubricant seal 7 of O-ring type divides the pressure side from the drain side at the outside of the injector sleeve 2. Through adjustment of the clearance and the length of the fit between the injector sleeve 2 and the retainer nut 22, the oil flow and thus the cooling of the injector can be optimised. The fit represents a journal bearing in the lower part of the injector.

Through the limited diameter of the injector, the axial load from the combustion pressure will be limited. The axial force is carried by the roller bearing 16, which transfer the force to the tension sleeve 15 which is threaded into the cylinder head 5. The tension sleeve 15 clamps the injector sleeve 2 towards the sealing ring 3 which seals between gas and oil at the outside of the injector sleeve.

The fuel connection for the device according to FIG. 1 is designed as a hydraulic swivel 11. The swivel 11 is cross drilled and the ends are designed so that the fuel pressure on each side of the swivel 11 is the same, making it axially force neutral. The leak flow is limited through a tight fit between the swivel 11 and corresponding diameter in the injector body. A fuel line 21 is screwed into the swivel 11 and provided with a conical seal. The leakage fuel is let out in the with the pressure line concentric space 20. The leakage fuel area is sealed from lubricating oil with the intermediate seals 10 of O-ring type and the return fuel seals 9, 12.

An alternative fuel supply and drain system is to utilise elastic deformations in tubing. ±5° torsion of a Ø6 mm pressure tube with the length 200 mm gives the acceptable shear stress level of ±110 N/mm. By a deliberate shaping of the tubing it should be possible to further decrease the stress level, alternately permit bigger turning angle. In that way there is no need for the swivel and the sealing is simplified.

The revolving movement in FIG. 1 is thought to be achieved by actuating the lever 17 at the position 18. The engine is thought to have an extra cam lobe on the engine cam shaft and a push rod and rocker arm similar to those used for valve opening. The rocker arm is however designed to convert the pushrod movement which is mainly along the injector axis to a movement perpendicular to the injector axis. The movement is transferred to the lever 17 at the position 18 which also is spring loaded for its return stroke.

For disassembly of the injector according to FIG. 1, it is appropriate to remove the tension sleeve 15 and by that the injector can be pulled out provided the fuel line first has been dismounted. For ease of pulling out the injector sleeve 2 it should be threaded for a pull out tool in the proximity of the oil outlet 8.

To eliminate the risk of loosen the upper retaining nut 14 from the rotating movement, the assembly torque is 10-fold the torque from the rotating movement.

To prove the plausibility of the concept according to this first design the following calculated example is presented:

$$\text{Moment of inertia } J = m \cdot r^2 / 2$$

Study a solid steel injector with simple cylindrical shape. Assume diameter Ø21 mm and the length L=150 mm which gives the mass 0.4 kg. J then will be $2.23 \cdot 10^{-5}$ kgm².

Assume further the engine speed to 2000 rpm.

Figure 2:
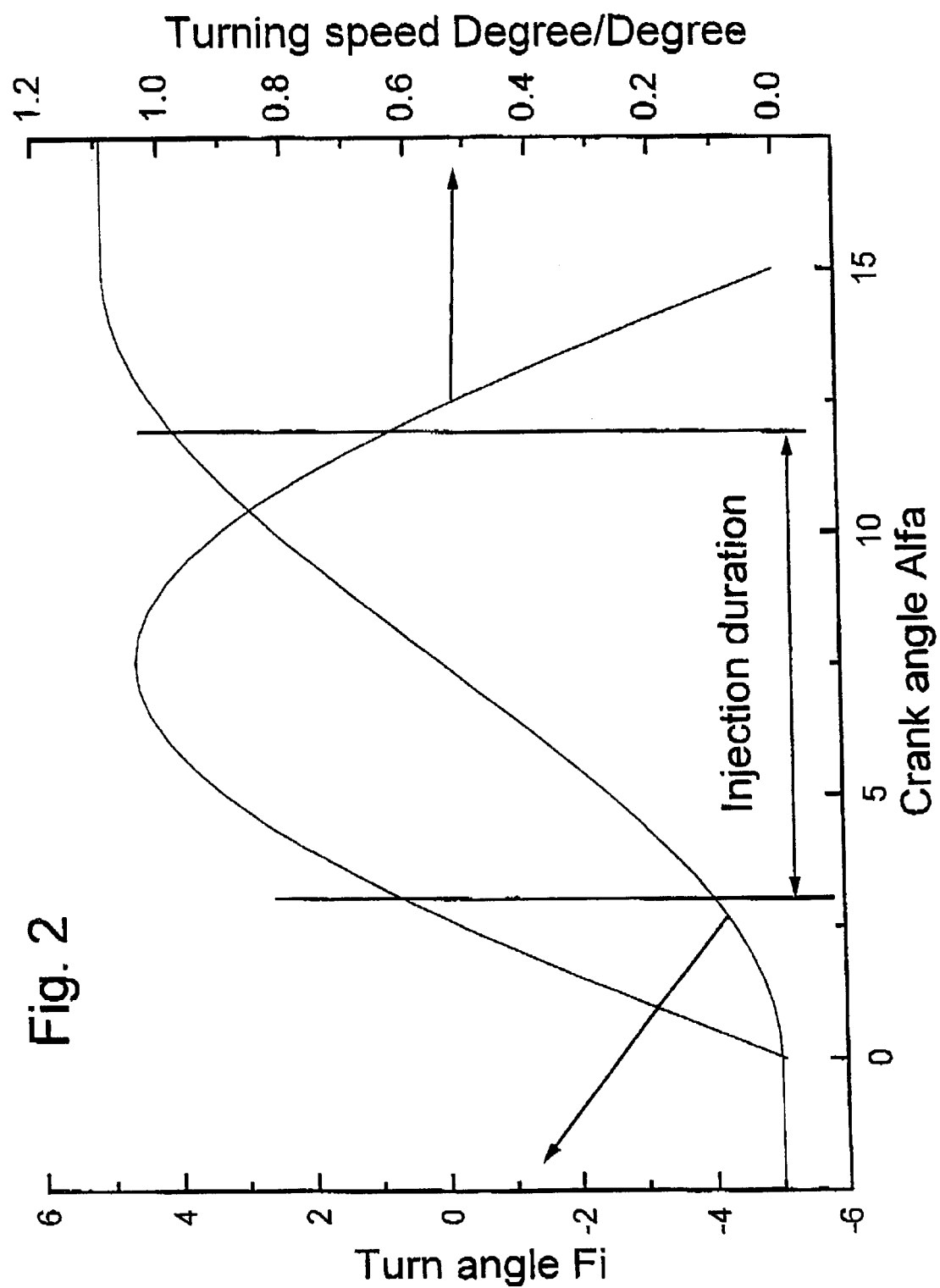
FIG. 2 shows a diagram over revolution angle and revolving speed as a function of the crank angle for a device according to the invention.

FIG. 2 shows with these assumptions a diagram over the relation between the turning angle and turning speed for the injector if one assumes the movement to continue for 15 crank angle degrees and be sinus shaped. The relation according to FIG. 2 then is governed by the formula:

$$\phi = \phi_{max} \cdot \sin(K_1 + K_2 \cdot \alpha)$$

Figure 3:
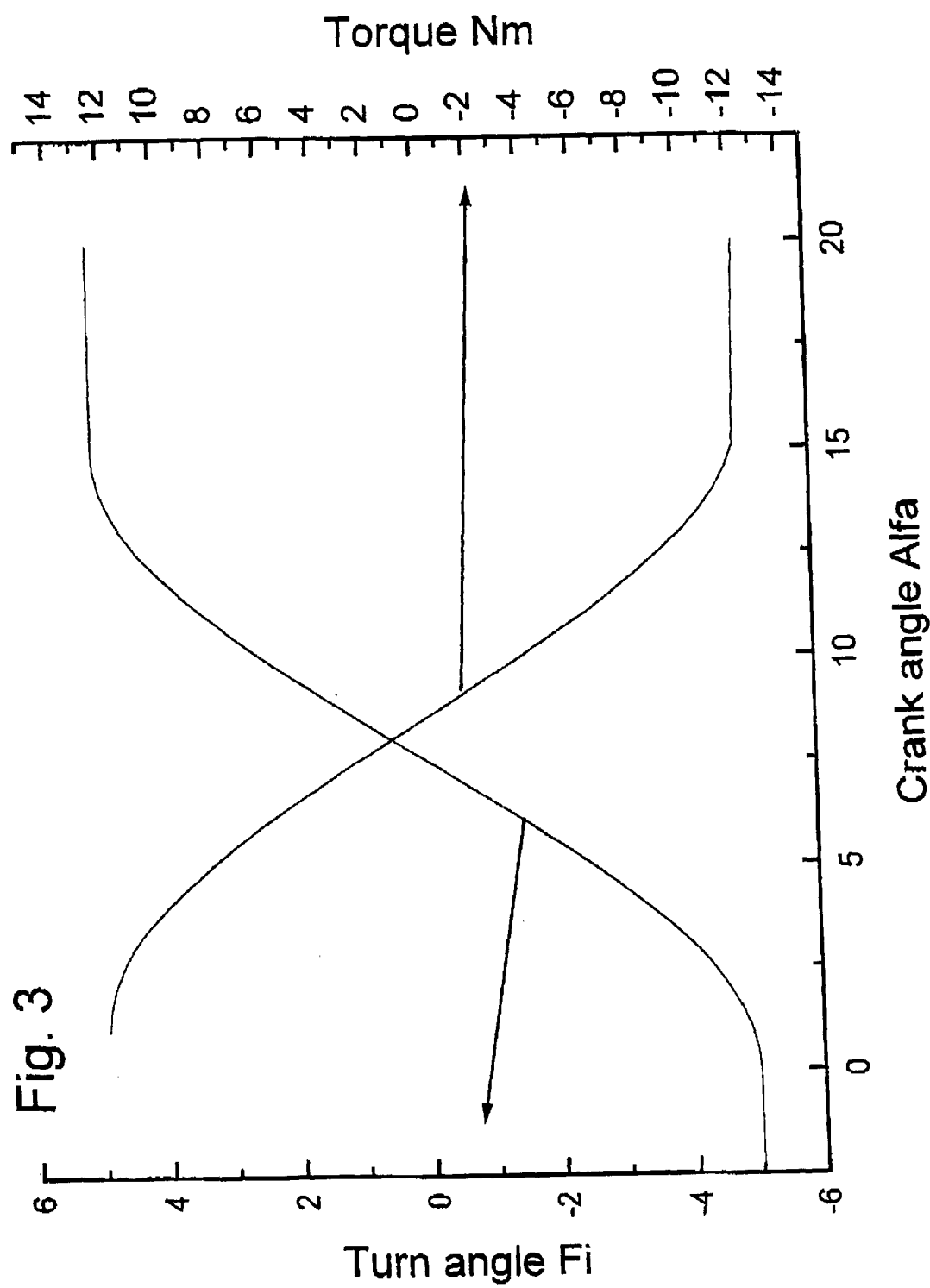
FIG. 3 shows a diagram over revolution angle and torque as a function of the crank angle for a device according to the invention.

FIG. 3 shows with these assumptions a diagram with the relation between the turning angle and torque from inertia forces for the injector.

The maximum inertia torque according to FIG. 3 is 12.3 Nm. On a lever of 60 mm this means 12.3/0.06=205 N force on the lever. Thus a spring is required that gives at least 205 N at the turning angle +5 degrees. The duration of the return stroke to −5 degrees can then go on for a long time with very low acceleration and low required spring force. To J should be added the contribution from the rocker arm and additional mechanical components.

Lever stroke 60·sin (10)=10.4 mm

Max. injector speed at engine speed 2000 rpm 219 Rad/s

Max. speed at the lever 219·0.06=13.1 m/s

Rotational energy $E_r = J \cdot \omega^2 / 2$ $E_r = 2.23E{-}05 \cdot 219^2 / 2$ $E_r = 0.53$ Nm To be compared with the pumping energy $E_p$ at part load, assuming 1000 bar and 100 mm³ per injection.

$E_p = V \cdot P$ $E_p = 100E{-}9 \cdot 1000E5$ $E_p = 10$ Nm

In this example the maximum rotational energy is about 5% of the pumping energy which can be regarded as acceptable.

Figure 4:
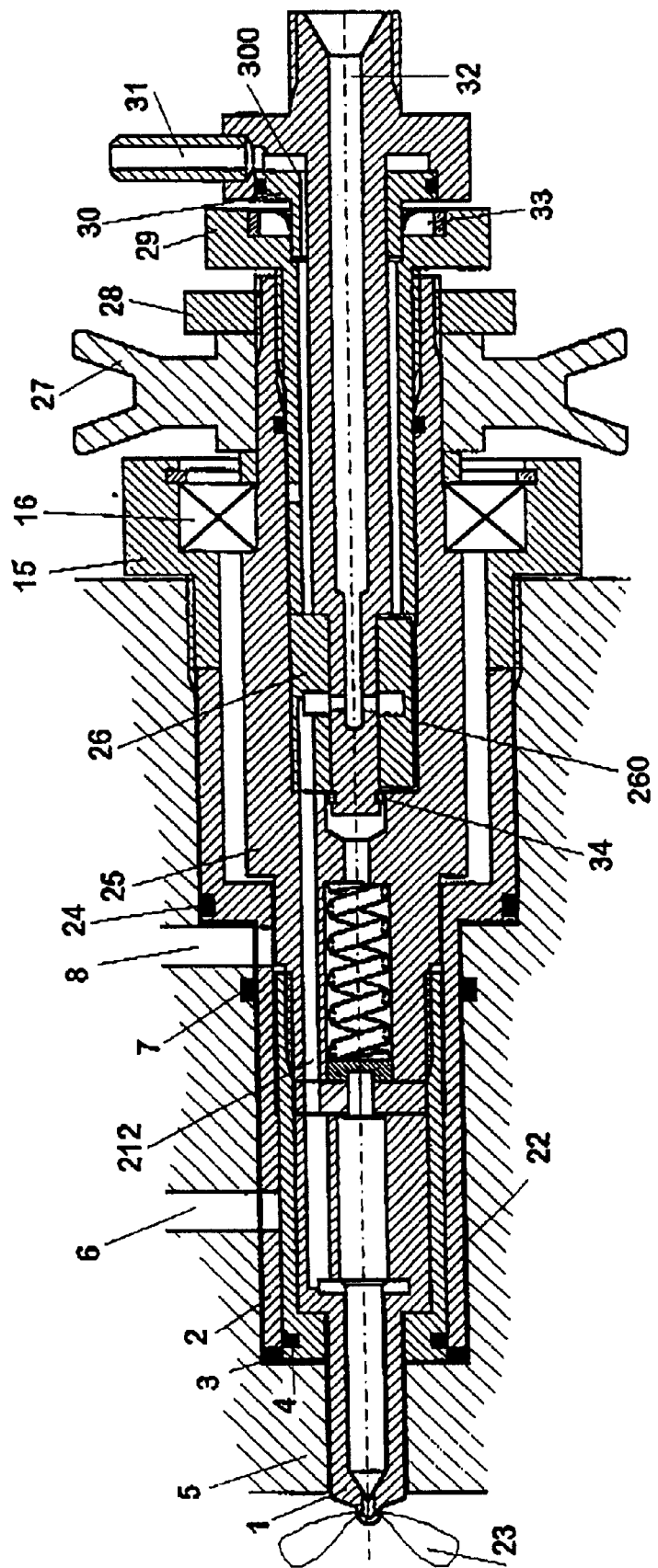
FIG. 4 shows an axial section through a second design of a device according to the invention.

FIG. 4 shows a second design of an injector according to the present invention. The numerical references in FIG. 4 which corresponds with that in FIG. 1 described design denote corresponding components why these components are not described again. As shown by FIG. 4 the injector nozzle 1 is provided with an injector body 25 which is directly supported by the roller bearing 16 in the tension sleeve 15. Further the injector sleeve 2 is provided with an upper seal 24 for the oil outlet 8. This upper seal 24 correspond mostly to the intermediate seal 10 described for the first design showed in FIG. 1. The roller bearing 16 in this second design is in addition sealed on its upper side to prevent oil from leaking out.

The injector body 25 is provided with a with the injector sleeve concentric arranged swivel sleeve 26 turnable connected to the injector body 25. The swivel sleeve is provided with external axial grooves 260 which allows leakage fuel outside the swivel sleeve 26. The sleeve is further rotationally located by not shown gudgeon pins. The injector body 25 is then in its upper end opposite the cylinder side, provided with a rotationally fixed mean for rotation 27 in the shape of a pulley which is axially located to the injector body 25 by a nut 28. The pulley is connected to a not shown mean for rotation which drives the injector intermittent, continues, oscillating or in an other suitable way at which the direction of injection varies in the same way. The swivel sleeve is further axially located in the injector by a tension sleeve 29 which is threaded internally inside the injector body 25.

A leakage fuel sleeve 30 is mounted with press fit on a coaxial with the swivel sleeve 26 mounted swivel shaft 32 on which also a leakage fuel return line 31 is radial mounted. The leakage fuel sleeve 30 is provided with axially internal grooves 300 for passage of leakage fuel. The tension sleeve 29 is then provided with a leakage fuel seal 33 which is arranged to seal between the tension sleeve 29 and the leakage fuel sleeve 30. The swivel shaft 32 is axially fixed through a circlip 34 and is also journalled in bearing in the lower against the cylinder directed end of the injector body 25. The circlip 34 also enables simple disassembly of the swivel sleeve. Leakage fuel can then flow outside the swivel sleeve 26 in between the swivel shaft 32 and the tension sleeve 29, then through the leakage fuel sleeve 30's groove 300 and out through the leakage fuel connection 31. In the non rotating swivel shaft 32 upper threaded end, a fuel line is mounted which supplies fuel in the centre of the injector through the swivel shaft 32, out through the rotating swivel sleeve 26 and further through the supply channel 212 to the injector nozzle 1.

Figure 5:
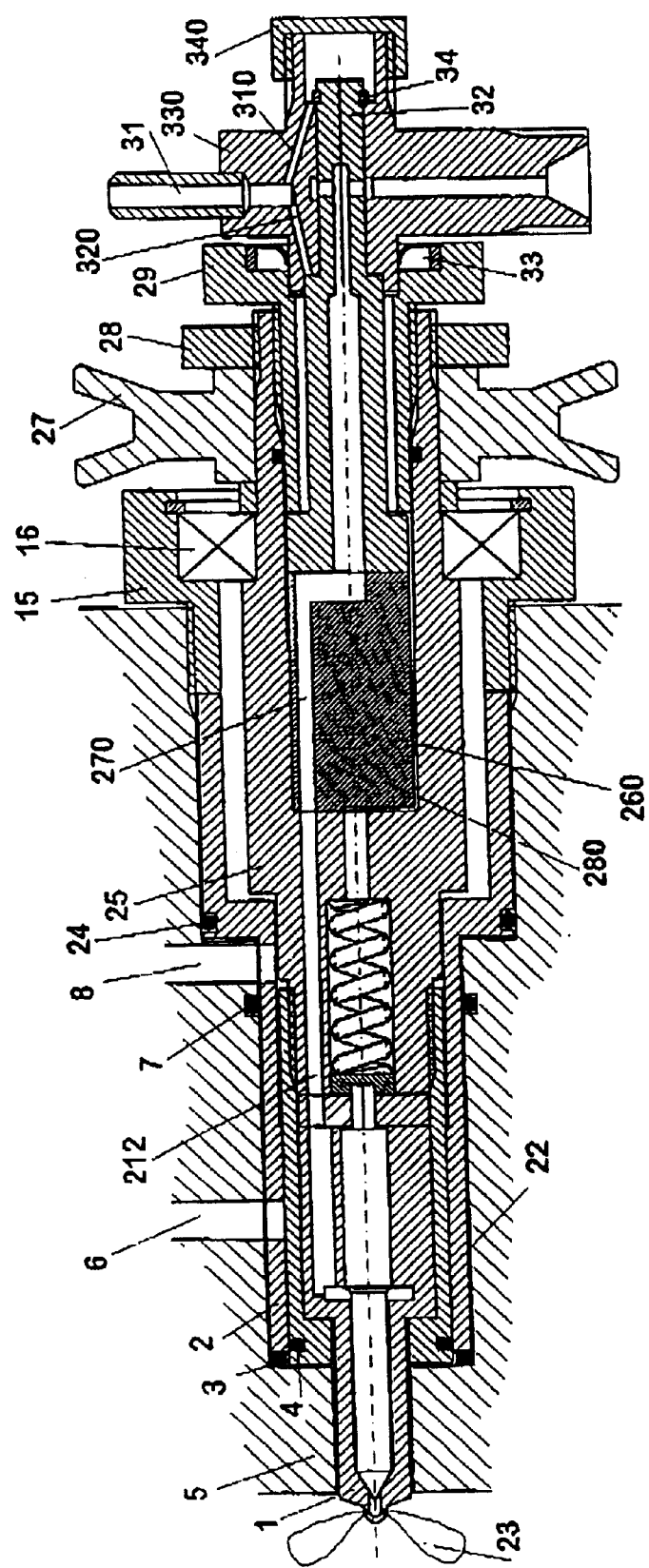
FIG. 5 shows an axial section through a third design of a device according to the invention.

FIG. 5 shows a third design of an injector according to present invention in which corresponding components are designated with identical number notations as earlier figures. The injector body 25 is provided with a centrally placed swivel body 280 which rotates together with the injector body 25 inside the injector sleeve 2 in the same way as has been shown in the design according to FIG. 4. Axially aligning and rotating with the swivel body 280 is a swivel shaft 32 on which a connector body 330 is suspended by a journal bearing. The connector body 330 enables supply of fuel to the swivel shaft 32 and drain of leakage fuel through drain channels 310, 320 and then to the leakage fuel connection 31. Axially with the swivel shaft 32 is a cover 340 arranged in the connector body 330 inside which circlip 34 for disassembly of the swivel shaft is arranged. The design style allows supply of fuel perpendicular in towards the swivel shaft 32 contrary to the design according to FIG. 4 where fuel is supplied axially through the swivel shaft 32.

Thus an injector according to the two latest designs which is designed to be driven during the engine revolution can be run with principally constant revolution speed. Then the lever 17 in FIG. 1 is exchanged with a gear wheel or pulley as a mean of rotation 27 according to FIGS. 4–5. The fuel inlet and also the return flow is then preferably arranged through the centre of the driving wheel with a swivel sleeve 26 respectively swivel body 280 differently shaped compared to the swivel 11 in FIG. 1. Then the injector rotational speed can be optimised with regard to the engine load case.

Engines with unit injectors have simplified fuel supply, but the high pumping forces put high demands on the axial bearing. It is advantageous to use the pumping movement to achieve axial movement alternatively rotational movement. The turning can also be achieved by the aid of the injection pressure.

Besides a purely mechanical turning mechanism one can think of mechanisms where the injection pressure or the pumping force (with unit injectors) creates the movement.

What is claimed is:

1. Method for fuel injection in a combustion engine, comprising changing direction of fuel injection during injection controlled from outside an injector to avoid injection in an already fuel rich area, wherein direction of fuel injection is changed by rotating an injector during injection, wherein the injector includes a turnable, internal hole carrying element.

2. Method for fuel injection in a combustion engine, comprising changing direction of fuel injection during injection controlled from outside an injector to avoid injection in an already fuel rich area, wherein the injector rotates at a substantially constant rotational speed, wherein the injector includes a turnable, internal hole carrying element.

3. Method for fuel injection in a combustion engine, comprising changing direction of fuel injection during injection to avoid injection in an already fuel rich area, wherein direction of fuel injection is changed by rotating an injector during injection, wherein the rotating of the injector causes an elastic deformation of a fuel line.

4. Method according to claim 3, wherein the injector rotates at a substantially constant rotational speed.

5. Method according to claim 3, wherein the injector includes a turnable, internal hole carrying element.

6. Method for fuel injection in a combustion engine, comprising changing direction of fuel injection during injection to avoid injection in an already fuel rich area, wherein direction of fuel injection is changed by rotating an injector during injection, wherein a hydraulic swivel element transfers fuel from a stationary element to a movable element to rotate the injector.

7. Method according to claim 6, wherein the injector rotates at a substantially constant rotational speed.

8. Method according to claim 6, wherein the injector includes a turnable, internal hole carrying element.

9. Method for fuel injection in a combustion engine, comprising changing direction of fuel injection during an injection controlled from outside an injector to avoid injection in an already fuel rich area.

10. Method according to claim 9, wherein the injector rotates at a substantially constant rotational speed.

11. Method according to claim 9, wherein the injector includes a turnable, internal hole carrying element.

12. Method according to claim 9 wherein direction of fuel injection is changed by rotating an injector during the injection.

13. Method according to claim 12, wherein the injector rotates at a substantially constant speed.

14. Device for fuel injection in a combustion engine, comprising, an injector with an injector nozzle having at least one hole arranged to inject fuel into a combustion chamber of the engine, the injector being adapted to change a direction of fuel injection during an injection controlled from outside the injector to avoid injection in an already fuel rich area of the combustion chamber.

15. Device according to claim 13, wherein the injector is provided with an external concentric non-turnable retaining nut including a piston ring seal arranged to seal against a non-turnable injector sleeve in the cylinder head.

16. Device according to claim 15 wherein the injector is provided with a lever arranged to turn the injector.

17. Device according to claim 15 wherein the injector includes an injector body including means for rotating the injector.

18. Device according to claim 15 wherein the injector includes, on one side thereof, a journal bearing in the injector sleeve and, on another side thereof, is suspended by a roller bearing in a tension sleeve screwed in to the cylinder head.

19. Device according to claim 18 wherein the fuel connection coaxial with the swivel shaft.

20. Device according to claim 15, wherein the injector sleeve includes an oil supply to the cylinder head and an oil outlet from the cylinder head.

21. Device according to claim 20 wherein the injector is provided with a lever arranged to turn the injector.

22. Device according to claim 20 wherein the injector includes an injector body including means for rotating the injector.

23. Device according to claim 20 wherein the injector includes, on one side thereof, a journal bearing in the injector sleeve and, on another side thereof, is suspended by a roller bearing in a tension sleeve screwed in to the cylinder head.

24. Device for fuel injection in a combustion engine, comprising, an injector with an injector nozzle having at least one hole arranged to inject fuel into a combustion chamber of the engine, the injector being adapted to change a direction of fuel injection during an injection to avoid injection in an already fuel rich area of the combustion chamber, wherein the injector is turnably journalled in bearings in an engine cylinder head.

25. Device according to claim 24, wherein the injector is provided with a lever arranged to turn the injector.

26. Device according to claim 25 wherein the injector includes, on one side thereof, a journal bearing in the injector sleeve and, on another side thereof, is suspended by a roller bearing in a tension sleeve screwed in to the cylinder head.

27. Device according to claim 25, wherein the injector is provided with a fuel line for fuel supply radially connected to a swivel that is coaxial with and turnably mounted in the injector.

28. Device according to claim 27 wherein the injector includes, on one side thereof, a journal bearing in the injector sleeve and, on another side thereof, is suspended by a roller bearing in a tension sleeve screwed in to the cylinder head.

29. Device according to claim 27, wherein a fuel return in the injector is connected to a concentrically arranged leakage fuel connection around the fuel line to allow for return fuel.

30. Device according to claim 29 wherein the injector includes, on one side thereof, a journal bearing in the injector sleeve and, on another side thereof, is suspended by a roller bearing in a tension sleeve screwed in to the cylinder head.

31. Device according to claim 24 wherein the injector includes an injector body including means for rotating the injector.

32. Device according to claim 31 wherein the injector includes, on one side thereof, a journal bearing in the injector sleeve and, on another side thereof, is suspended by a roller bearing in a tension sleeve screwed in to the cylinder head.

33. Device according to claim 31, wherein the injector body includes a fuel channel and a swivel body is mounted in the injector body and axially aligns with a swivel shaft having a fuel channel, the swivel shaft being concentrically mounted in the injector body so that fuel is supplied to the injector nozzle through the swivel shaft and then through the swivel body.

34. Device according to claim 33, wherein a connector body is arranged to contain the upper part of the swivel shaft.

35. Device according to claim 34, wherein the connector body is provided with radial connections for fuel supply and return flow.

36. Device according to claim 31, wherein a swivel sleeve is disposed in a fuel channel in an injector body and is turnably mounted around a swivel shaft and is provided with a fuel channel, the swivel shaft being concentrically mounted in the injector body, wherein fuel is supplied to the injector nozzle through the swivel shaft and to a leakage fuel connection in the swivel shaft.

37. Device according to claim 36, wherein the fuel connection coaxial with the swivel shaft.

38. Device according to claim 36 wherein the injector includes, on one side thereof, a journal bearing in the injector sleeve and, on another side thereof, is suspended by a roller bearing in a tension sleeve screwed in to the cylinder head.

39. Device according to claim 36, wherein the swivel sleeve includes at least one groove located on an outside thereof, the groove allowing leakage fuel to pass around the swivel sleeve to a passage along a periphery of the swivel shaft to the leakage fuel connection.

40. Device according to claim 39 wherein the swivel sleeve is axially located in the injector by a tension sleeve which is internally fastened in the injector body by threads.

41. Device according to claim 39 wherein the injector includes, on one side thereof, a journal bearing in the injector sleeve and, on another side thereof, is suspended by a roller bearing in a tension sleeve screwed in to the cylinder head.

42. Device according to claim 39 wherein the fuel connection coaxial with the swivel shaft.

43. Device according to claim 36 wherein the swivel sleeve is axially located in the injector by a tension sleeve which is internally fastened in the injector body by threads.

44. Device according to claim 43 wherein the injector includes, on one side thereof, a journal bearing in the injector sleeve and, on another side thereof, is suspended by a roller bearing in a tension sleeve screwed in to the cylinder head.

45. Device according to claim 43 wherein the fuel connection coaxial with the swivel shaft.

46. Device according to claim 43, a leakage fuel sleeve with axial internal grooves is provided for leakage fuel and is mounted on the swivel shaft, and the tension sleeve is provided with a leakage fuel seal arranged to seal against the leakage fuel sleeve.

47. Device according to claim 46 wherein the injector includes, on one side thereof, a journal bearing in the injector sleeve and, on another side thereof, is suspended by a roller bearing in a tension sleeve screwed in to the cylinder head.

48. Device according to claim 46 wherein the fuel connection coaxial with the swivel shaft.

* * * * *